Feb. 11, 1941.  E. N. FOSS, 2D  2,231,826
THERMOSTATICALLY CONTROLLED HEATING SYSTEM
Filed April 3, 1940
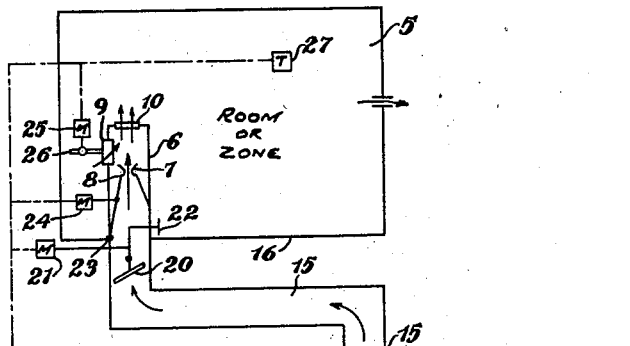
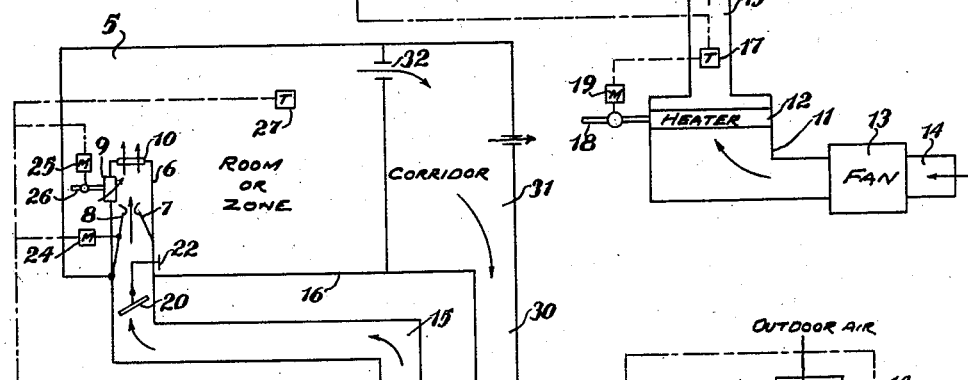
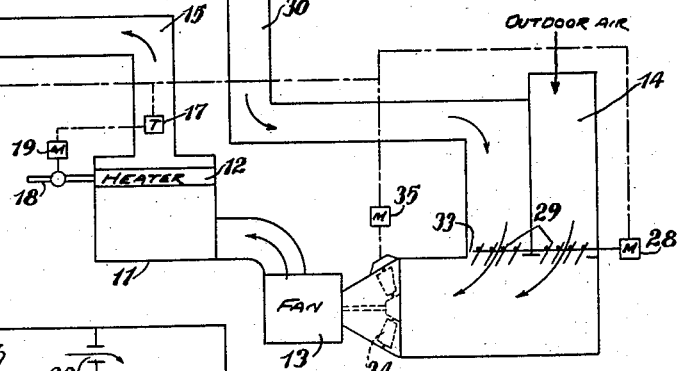
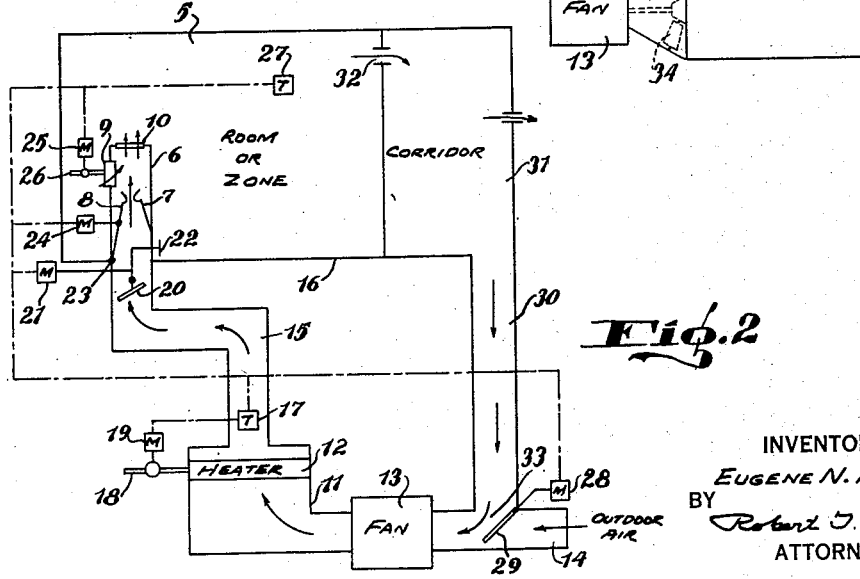
INVENTOR
EUGENE N. FOSS, 2ND.
BY
Robert J. Palmer
ATTORNEY Patented Feb. 11, 1941

2,231,826

UNITED STATES PATENT OFFICE 2,231,826

THERMOSTATICALLY CONTROLLED HEATING SYSTEM

Eugene N. Foss, 2nd, Dedham, Mass., assignor to
B. F. Sturtevant Company, Boston, Mass.

Application April 3, 1940, Serial No. 327,559

18 Claims. (Cl. 237—2)

This invention relates to thermostatically controlled heating systems, and relates more particularly to heating systems having central heating plants. It adds to such systems local air recirculation units having such characteristics and so coordinated and controlled that uniform air heating and distribution are obtained at a minimum of expense.

School rooms and the like are now generally heated by one of two systems. In one system, a hot air furnace supplies heated air under pressure directly into the rooms. In the other of the two systems, what are known as unit ventilators are placed directly in the rooms to heat and circulate the air therein. In neither of the two systems is proper circulation provided, and in the system utilizing unit ventilators, objection is frequently made to the drafts created as a result of the mixture of cold air with recirculated air in the room units.

This invention provides for central as well as local heating and provides adequate circulation and uniform distribution without drafts, through the use of local units containing ejectors through which tempered outdoor air, under static pressure, is forced, to induce the recirculation of air through the units. The recirculated air is heated in the units and the mixed outdoor air and recirculated air is discharged at relatively high velocity upwardly into the rooms, the high velocity discharge and the recirculation of room air resulting in proper circulation and uniform temperatures.

A feature of the invention resides in the provision of controls for restricting the volume of outdoor air during warm-up periods before the rooms are occupied; for controlling the temperature during room occupancy by coordinating the heat added to the air by the central and local heaters, and by varying the air volumes; and for affecting cooling when desired by throttling the heaters, by reducing recirculation and by supplying increased volumes of outdoor air.

An object of the invention is to supply tempered outdoor air under pressure, from a central heating plant through local ejectors which induce the flow of room air.

Another object of the invention is automatically to control the operation of local ejector units supplied with tempered outdoor air from a central heating plant.

Another object of the invention is to induce the flow of room air through the supply of heated air under pressure from a central heating plant, to local ejector units, and to coordinate the operation of the local units and of the central plant during warm-up periods, during periods of room occupancy when heating is required, and during periods of room occupancy when cooling is required, for maximum comfort and efficiency.

The invention will now be described with reference to the drawing, of which:

Fig. 1 is a diagrammatic view of one embodiment of the invention in which a central heating plant supplies all outdoor air to a typical local ejector unit;

Fig. 2 is a diagrammatic view of another embodiment of the invention in which provision is made for recirculating room air through the central heater, and Fig. 3 is a diagrammatic view of another embodiment of the invention in which a central fan providing variable volumes of air is used.

With reference to Fig. 1, the space 5 which may be a typical room or zone to be supplied with heat and air for ventilation, contains the local ejector unit 6. The unit 6 may by way of example, be of the type disclosed generally in the Patent No. 2,000,597 which issued May 7, 1935, on an application of R. E. Keyes and comprises a rectangular box of sheet metal which includes the longitudinally extending ejector nozzles 7 and 8, the finned tube heater 9 in a side wall of the unit, and the air discharge grille 10.

The central heating plant 11 includes the heater 12 and the fan 13 for drawing fresh outdoor air through the inlet 14. The output side of the plant 11 is connected to the supply duct 15, which extends through the floor 16 of the space 5 into the base of the unit 6.

The duct 15 adjacent the plant 11 contains the thermostat 17 which controls the supply of steam through the pipe 18 to the heater 12 by adjustment of the valve motor 19. The duct 15 also contains adjacent the base of the unit, the damper 20 adapted to be adjusted by the motor 21 and the hand operated lever 22.

The ejector nozzle 8 illustrated, is pivoted at 23 and adapted to be adjusted by the motor 24 to vary its position relative the nozzle 7 for varying the ejector effect.

The air passing from the duct between the nozzles 7 and 8 induces the flow of room air as recirculated air, through the perforated heater 9 into the unit 6 where it is mixed with the air from the plant 11 and discharged through the grille 10. The heat added to the recirculated air by the heater 9 is controlled by adjustment of the valve motor 25 controlling the supply of steam through the pipe 26.

The thermostat 27 in the space 5 controls the operation of the system as will now be described. When the system is first started up as in the early morning after an overnight period of reduced temperature, the temperature of the air in the space 5 will, of course, be considerably below the temperature which it is desired to maintain in the space during occupancy, and the thermostat 27 adjusts the thermostat 17 to cause it to adjust the valve motor 19 to admit unthrottled steam into the heater 12. It also adjusts the valve motor 25 to admit unthrottled steam into the heater 9. It also adjusts the nozzles 7 and 8 relatively close together to provide for maximum ejector effect with resulting maximum recirculation of room air.

When the temperature of the air in the space 5 reaches the desired temperature which, for example, may be 68° F., the thermostat 27 acts to reset the thermostat 17 causing it to respond to the temperature of the air leaving the heater 12, and to adjust the valve motor 19 to cause the heater 12 normally to maintain a delivered air temperature which may, for example, be 60° F. The thermostat 27 also adjusts the valve motor 25 causing it to throttle the steam supplied to the heater 9, and adjusts the motor 24 causing it to adjust the ejector nozzle 8 for maintaining the desired ratio of recirculated air to outdoor air during room occupancy. For example, in some localities, it is required that at least 50% of the air circulated through school rooms be outdoor air which permits 50% recirculation. The ejector may be adjusted to induce a larger proportion of recirculated air during warm-up periods and to supply 50% recirculated air during class periods.

When the temperature in the space 5 advances to 69° F., the thermostat acts to cause the valve motor 25 further to throttle the steam supply to the heater 9. If the temperature continues to advance, at 70° F. the steam to the heater 9 is shut off.

If the room temperature advances above 70° F., the thermostat 27 first acts to reset the duct thermostat 17 to cause it to mainain a delivered air temperature of say 50° F. It then acts to adjust the valve motor 19 to throttle the steam supply to the heater 12. If the temperature continues to rise, at say 71° F., the thermostat 27 causes the motor 24 to move the nozzle 8 away from the nozzle 7 to decrease the ejector effect and to reduce the proportion of recirculated air. At the same time, the motor 21 is caused to adjust the damper 20 towards open position to admit more outdoor air for cooling.

The hand operated lever 22 is provided for adjusting the damper 20 for balancing the air to the unit 6 to compensate for differences in air pressure due to several units 6 being supplied by the same central fan.

In the embodiment of Fig. 2, air from the occupied space is recirculated through the central heater, one advantage of this being that it is unnecessary to use the relatively cold outdoor air and to heat same during the warm-up period. Air from the space 5 passes through the opening 32 into a recirculated air duct or passage which for example, may be the corridor 31, and then through the recirculated air duct 30 into the intake of the fan 13. The damper 29 is operable by the motor 28 to vary the proportion of recirculated air to outdoor air entering the fan. The preferred operating cycles of this embodiment will now be described.

At the beginning of the warm-up period, the thermostat 27 causes the damper motor 28 to adjust the damper 29 to close off the fresh air inlet 14 and to open the outlet 33 of the duct 30 into the inlet of the fan 13. This results in a saving of fuel since the air supplied to the ejectors is recirculated air. The thermostat 27 also adjusts the valve motor 25 to increase the supply of steam to the heater 9 and through the thermostat 17, the valve motor 19 to increase the supply of steam to the central heater 12. In this embodiment it is preferred that the ejector nozzles be not adjusted during the warm-up period.

When the room temperature reaches 68° F., the thermostat 27 as in the embodiment of Fig. 1, places the duct thermostat 17 in control of the central heater 12 to maintain the air in the duct 15 at 60° F. The thermostat 27 also causes the damper motor 28 to adjust the damper 29 to throttle or close off the recirculated air supply to the fan 13, and to open up the outdoor air inlet 14.

When the room temperature reaches 69° F., the heater 9 is throttled and when the room temperature reaches 70° F., the heater 9 is shut off as in the embodiment of Fig. 1. When the room temperature exceeds 70° F., the central heater 12 is throttled and if this does not correct for the increase, the ejector nozzles are adjusted for minimum recirculation and the damper 20 is adjusted for maximum outdoor air as in the embodiment of Fig. 1.

The embodiment of Fig. 3 is similar to that of Fig. 2 except that the fan 13 is provided in its inlet with the spin inducing vanes 34 adjustable by the motor 35 for varying the volume of air moved by the fan. In this embodiment the thermostat 27 does not act to adjust the damper 20. This vane controlled fan is similar to that disclosed in the Patent No. 1,989,413 issued Jan. 29, 1935, on an application of H. F. Hagen. This embodiment operates in the same way as does the embodiment of Fig. 2 except that when the indoor temperature rises above 70° F., when the ejector nozzles are adjusted for minimum recirculation, the vanes 34 are adjusted through the control of the motor 35 by the thermostat 27, towards open position for increasing the volume of air handled by the fan 13. This results in a greater volume of cool outdoor air being passed into the space 5 and an increased cooling effect.

Prior unit ventilators included several blower wheels mounted on a longitudinal shaft, a motor for operating the blowers, outdoor air inlets through walls of the rooms directly into the units and complicated inter-connected damper arrangements, all resulting in relatively expensive equipment occupying considerable space, causing considerable noise, and requiring considerable maintenance. Since no direct connected outdoor air inlets, interconnected dampers, blowers, or motors are required with the ejector units of this invention, less space is required, less noise is produced, the expense is less, and what is even more important, no drafts are produced and the air distribution is better.

The thermostat 27 may control the thermostats 17 and the various valves, nozzle control and damper motors electrically or through air lines. Such controls are well known to those skilled in the art and for the sake of brevity and clearness, their details have not been disclosed herein.

While several embodiments of the invention have been described for the purpose of illustration, it should be understood that the invention is not limited to the exact apparatus and arrangement of apparatus illustrated as many departures may suggest themselves to those skilled in the art

What is claimed is:

1. A heating system for supplying heated air to a space, comprising a central air heater, a local recirculation unit having an air outlet in said space, an air ejector in said unit, means forming a recirculated air inlet in said unit so placed with respect to said ejector that the inflow of recirculated air from said space is induced by flow of air through said ejector, a local heater in said unit, means including a duct for supplying air under pressure from said central heater through said ejector, means including a duct thermostat responsive to the temperature of the air in said duct for maintaining the temperature of the air from said central heater at a predetermined temperature, and means including a local thermostat responsive to the temperature of the air in said space for adjusting said local heater for maintaining the air in said space at a higher predetermined temperature.

2. A heating system for supplying heated air to a space, comprising a central air heater, a local recirculation unit having an air outlet in said space, an air ejector in said unit, means for varying the air inducing effect of said ejector, means forming a recirculated air inlet in said unit so placed with respect to said ejector that the inflow of recirculated air from said space is induced by flow of air through said ejector, a local heater in said unit, means including a duct for supplying air under pressure from said central heater through said ejector, means including a duct thermostat responsive to the temperature of the air in said duct for controlling the temperature of the air from said central heater, and means including a local thermostat responsive to the temperature of the air in said space for controlling said local heater and said varying means.

3. A heating system for supplying heated air to a space, comprising a central air heater, a local recirculation unit having an air outlet in said space, an air ejector in said unit, means forming a recirculated air inlet in said unit so placed with respect to said ejector that the inflow of recirculated air from said space is induced by flow of air through said ejector, volume control means for increasing the volume of air through said duct into said ejector, a local heater in said unit, means including a duct for supplying air under pressure from said central heater through said ejector, means including a duct thermostat responsive to the temperature of the air in said duct for controlling the temperature of said central heater, and means including a local thermostat responsive to the temperature of the air in said space for controlling said local heater and said volume control means.

4. A heating system for supplying heated air to a space, comprising a central air heater, a local recirculation unit having an air outlet in said space, an air ejector in said unit, means for varying the air inducing effect of said ejector, means forming a recirculated air inlet in said unit so placed with respect to said ejector that the inflow of recirculated air from said space is induced by flow of air through said ejector, volume control means for increasing the volume of air through said duct into said ejector, a local heater in said unit, means including a duct for supplying air under pressure from said central heater through said ejector, means including a duct thermostat responsive to the temperature of the air in said duct for controlling the temperature of said central heater, and means including a local thermostat responsive to the temperature of the air in said space for controlling said local heater, said varying means and said volume control means.

5. A heating system for supplying heated air to a space, comprising a central air heater, a local recirculation unit having an air outlet in said space, an air ejector in said unit, means forming a recirculated air inlet in said unit so placed with respect to said ejector that the inflow of recirculated air from said space is induced by flow of air through said ejector, a local heater in said unit, means for supplying air under pressure from said central heater through said ejector, a thermostat responsive to the temperature of the air from said central heater for controlling the temperature thereof, and means including a local thermostat responsive to the temperature of the air in said space for controlling said local heater and for controlling said central heater through said first mentioned thermostat.

6. A heating and ventilating system for supplying heated air to an indoor space, comprising a central air heater, a local recirculation unit having an air outlet in said space, an air ejector in said unit, means forming a recirculated air inlet in said unit so placed with respect to said ejector that the inflow of recirculated air from said space is induced by flow of air through said ejector, a local heater in said unit, means for supplying air under pressure from said central heater through said ejector, a thermostat responsive to the temperature of the air from said central heater for controlling the temperature thereof, and means including a local thermostat responsive to the temperature of the air in said space for adjusting said local heater for increasing the heat thereof until a predetermined local indoor temperature is reached, and for adjusting said first mentioned thermostat to cause same to adjust said central heater to increase the heat thereof until said predetermined temperature is reached.

7. A heating and ventilating system for supplying heated air to an indoor space, comprising a central air heater, a local recirculation unit having an air outlet in said space, an air ejector in said unit, means for varying the air inducing effect of said ejector, means forming a recirculated air inlet in said unit so placed with respect to said ejector that the inflow of recirculated air from said space is induced by flow of air through said ejector, a local heater in said unit, means for supplying air under pressure from said central heater through said ejector, and means including a local thermostat responsive to the temperature of the air in said space for controlling said heaters, and said varying means for reducing the temperatures of said heaters when a predetermined local indoor temperature is exceeded, and for then controlling said varying means for decreasing the inducing effect of said ejector.

8. A heating system for supplying heated air to an indoor space, comprising a central air heater, a local recirculation unit having an air outlet in said space, an air ejector in said unit, means forming a recirculated air inlet in said unit so placed with respect to said ejector that the inflow of recirculated air from said space is induced by flow of air through said ejector, a duct connecting said central heater and said ejector, volume control means for increasing the volume of air through said duct into said ejector, a local heater in said unit, and means including a local thermostat responsive to the temperature of the air in said space for adjusting said heaters, for reducing the temperatures of said heaters when a predetermined local indoor temperature is exceeded, and for then controlling said volume control means to increase the supply of air through said duct to said ejector upon further rise of said local temperature.

9. A heating system for supplying heated air to a space, comprising a central air heater, a local recirculation unit having an air outlet in said space, an air ejector in said unit, means forming a recirculated air inlet in said unit so placed with respect to said ejector that the inflow of local air from said space is induced by flow of air through said ejector, means including a central fan and a supply duct for supplying air under pressure from said central heater into said ejector, a local heater in said unit, means including a recirculated air duct supplying local air from said space as recirculated air into the inlet of said fan, means forming an outdoor air inlet into said fan, means for varying the proportion of recirculated air to outdoor air entering said fan, means including a local thermostat responsive to the temperature of the air in said space for controlling said last mentioned means and said local heater for increasing the proportion of recirculated air entering said fan and for increasing the temperature of said local heater during warm-up periods, and a thermostat responsive to the temperature of the air in said duct for controlling said central heater for maintaining a predetermined minimum temperature in the air entering said supply duct.

10. A heating and ventilating system for supplying heated air to a space, comprising a central air heater, a local recirculation unit having an air outlet in said space, an air ejector in said unit, means forming a recirculated air inlet in said unit so placed with respect to said ejector that the inflow of local air from said space is induced by flow of air through said ejector, means including a central fan and a supply duct for supplying air under pressure from said central heater into said ejector, a local heater in said unit, means including a recirculated air duct supplying local air from said space as recirculated air into the inlet of said fan, means forming an outdoor air inlet into said fan, means for varying the proportion of recirculated air to outdoor air entering said fan, and means including a thermostat responsive to the temperature of the air in said space for controlling said last mentioned means, said central heater and said local heater for increasing the proportion of recirculated air entering said fan and for increasing the temperature of said local heater and said central heater during warm-up periods.

11. A heating and ventilating system for supplying heated air to a space, comprising a central air heater, a local recirculation unit having an air outlet in said space, an air ejector in said unit, means forming a recirculated air inlet in said unit so placed with respect to said ejector that the inflow of local air from said space is induced by flow of air through said ejector, means including a central fan and a supply duct for supplying air under pressure from said central heater into said ejector, a local heater in said unit, means including a recirculated air duct supplying local air from said space as recirculated air into the inlet of said fan, means forming an outdoor air inlet into said fan, means for varying the proportion of recirculated air to outdoor air entering said fan, a local thermostat responsive to the temperature of the air in said space for controlling said last mentioned means, said central heater and said local heater for increasing the proportion of recirculated air entering said fan and for increasing the temperature of said local heater and said central heater during warm-up periods, and a thermostat responsive to the temperature of the air in said supply duct for adjusting said central heater for maintaining a predetermined minimum temperature in the air entering said supplying duct when said warm-up periods are concluded.

12. A heating and ventilating system for supplying heated air to a space, comprising a central air heater, a local recirculation unit having an air outlet in said space, an air ejector in said unit, means forming a recirculated air inlet in said unit so placed with respect to said ejector that the inflow of local air from said space is induced by flow of air through said ejector, means including a central fan and a supply duct for supplying air under pressure from said central heater into said ejector, a local heater in said unit, means including a recirculated air duct supplying local air from said space as recirculated air into the inlet of said fan, means forming an outdoor air inlet into said fan, means for varying the proportion of recirculated air to outdoor air entering said fan, a local thermostat responsive to the temperature of the air in said space for controlling said last mentioned means, said central heater and said local heater for increasing the proportion of recirculated air entering said fan and for increasing the temperature of said local heater and said central heater during warm-up periods, and a thermostat responsive to the temperature of the air in said supply duct and controlled by said local thermostat, for adjusting said central heater for maintaining a predetermined minimum temperature in the air entering said supply duct when said warm-up periods are concluded.

13. A heating and ventilating system for supplying heated air to a space, comprising a central air heater, a local recirculation unit having an air outlet in said space, an air ejector in said unit, means forming a recirculated air inlet in said unit so placed with respect to said ejector that the inflow of recirculated air from said space is induced by flow of air through said ejector, means for varying the air inducing effect of said ejector, volume control means for increasing the volume of air through said duct into said ejector, a local heater in said unit, means for supplying air under pressure from said central heater through said ejector, and means including a local thermostat responsive to the temperature of the air in said space for adjusting said heaters for reducing the temperatures of said heaters when a predetermined local indoor temperature is exceeded, and for then controlling said volume control means to increase the supply of air through said duct to said ejector upon further rise of said local temperature and for adjusting said varying means for decreasing the air inducing effect of said ejector.

14. A heating and ventilating system for supplying heated air to a space, comprising a central air heater, a local recirculation unit having an air outlet in said space, an air ejector in said unit, means forming a recirculated air inlet in said unit so placed with respect to said ejector that the inflow of recirculated air from said space is induced by flow of air through said ejector, a local heater in said unit, means including a duct for supplying air under pressure from said central heater through said ejector, a duct thermostat responsive to the temperature of the air in said duct for controlling the temperature of said central heater, and a local thermostat responsive to the temperature of the air in said space for controlling said local heater and for controlling through said first mentioned thermostat, said central heater.

15. A heating and ventilating system for supplying heated air to a space, comprising a central heater, a local recirculation unit having an air outlet in said space, an air ejector in said unit, means forming a recirculated air inlet in said unit so placed with respect to said ejector that the inflow of local air from said space is induced by flow of air through said ejector, means including a central fan and a supply duct for supplying air under pressure from said central heater into said ejector, a local heater in said unit, means including a recirculated air duct supplying local air from said space as recirculated air into the inlet of said fan, means forming an outdoor air inlet into said fan, means for varying the proportion of recirculated air to outdoor air entering said fan, and means including a local thermostat responsive to the temperature of the air in said space for controlling said last mentioned means and said local heater for increasing the proportion of recirculated air entering said fan and for increasing the temperature of said local heater during warm-up periods.

16. A heating and ventilating system for supplying heated air to a space, comprising a central air heater, a local recirculation unit having an air outlet in said space, an air ejector in said unit, means forming a recirculation air inlet in said unit so placed with respect to said ejector that the inflow of local air is induced by flow of air through said ejector, means including a central fan and a supply duct for supplying air under pressure from said central heater into said ejector, means including a recirculated air duct supplying local air from said space as recirculated air into the inlet of said fan, means forming an outdoor air inlet into said fan, means for varying the proportion of recirculated air to outdoor air entering said fan, and means including a local thermostat responsive to the temperature of the air in said space for controlling said last mentioned means and said central heater for increasing the proportion of recirculated air entering said fan and for increasing the temperature of said central heater during warm-up periods.

17. A heating system for supplying heated air to an indoor space, comprising a central air heater, a local recirculation unit, an air ejector in said unit having an air outlet in said space, means forming a recirculated air inlet in said unit so placed with respect to said ejector that the inflow of recirculated air from said space is induced by flow of air through said ejector, a duct connecting said central heater and said ejector, a fan including spin inducing vanes for supplying variable volumes of air through said duct into said ejector, a local heater in said unit, and means including a local thermostat responsive to the temperature of the air in said space for adjusting said heaters, for reducing the temperatures of said heaters when a predetermined local indoor temperature is exceeded, and for then adjusting said vanes to increase the supply of air through said duct to said ejector upon further rise of said local temperature.

18. A heating system for supplying heated air to an indoor space, comprising a local recirculation unit, an air ejector in said unit having an air outlet in said space, means forming a recirculated air inlet in said unit so placed with respect to said ejector that the inflow of recirculated air from said space is induced by flow of air through said ejector, a fan including spin inducing vanes for supplying variable volumes of air through said duct into said ejector, a local heater in said unit, means including a duct connecting said fan and said ejector, and means including a local thermostat responsive to the temperature of the air in said space for adjusting said heater, for reducing the temperatures of said heater when a predetermined local indoor temperature is exceeded and for then adjusting said vanes to increase the supply of air through said duct to said ejector upon further rise of said local temperature.

EUGENE N. FOSS, 2ND